(12) United States Patent
Kamijo et al.

(10) Patent No.: US 7,149,328 B2
(45) Date of Patent: Dec. 12, 2006

(54) METHOD AND APPARATUS FOR TRACKING MOVING OBJECTS IN SPATIAL DIFFERENTIAL FRAME PICTURES

(75) Inventors: Shunsuke Kamijo, Meguro (JP); Masao Sakauchi, Meguro (JP)

(73) Assignees: Fujitsu Limited, Kawasaki (JP); The Foundation for the Promotion of Industrial Science, Tokyo (JP)

( * ) Notice: Subject to any disclaimer, the term of this patent is extended or adjusted under 35 U.S.C. 154(b) by 753 days.

(21) Appl. No.: 10/379,560

(22) Filed: Mar. 6, 2003

(65) Prior Publication Data

US 2003/0169340 A1    Sep. 11, 2003

(30) Foreign Application Priority Data

Mar. 7, 2002  (JP) .............................. 2002-062439

(51) Int. Cl.
*G06K 9/00* (2006.01)
(52) U.S. Cl. ....................... 382/107; 382/199
(58) Field of Classification Search ................ 382/103, 382/104, 107, 199
See application file for complete search history.

(56) References Cited

U.S. PATENT DOCUMENTS

| | | | | |
|---|---|---|---|---|
| 5,210,799 A | * | 5/1993 | Rao | 382/22 |
| 5,838,828 A | * | 11/1998 | Mizuki et al. | 382/236 |
| 6,005,493 A | * | 12/1999 | Taniguchi et al. | 340/990 |
| 6,188,778 B1 | | 2/2001 | Higashikubo et al. | 382/104 |
| 2004/0131233 A1 | * | 7/2004 | Comaniciu et al. | 382/104 |

FOREIGN PATENT DOCUMENTS

| | | |
|---|---|---|
| EP | 0 420 657 A2 | 4/1991 |
| EP | 0 505 858 A1 | 9/1992 |
| EP | 0 807 914 A1 | 11/1997 |
| JP | 2001-148019 A | 5/2001 |
| WO | WO 00/31706 A1 | 6/2000 |

OTHER PUBLICATIONS

G.L. Gimel 'farb, "Texture Modeling by Multiple Pairwise Pixel Interactions", IEEE trans. PAMI, vol. 18, No. 11, pp. 1110-1114 (Nov. 1996).
Shunsuke Kamijo et al, "Traffic Monitoring and Accident Detection at Intersections", IEEE Transactions on Intelligent Transportation Systems, vol. 1, No. 2, pp. 108-118 (Jun. 2000).
U.S. Appl. No. 11/199,282, filed Aug. 9, 2005, Shunsuke Kamijo, et al., Fujitsu Limited.
U.S. Appl. No. 11/199,206, filed Aug. 9, 2005, Shunsuke Kamijo, et al., Fujitsu Limited.
U.S. Appl. No. 10/120,374, filed Apr. 12, 2002, Shunsuke Kamijo, et al., Fujitsu Limited, Masao Sakauchi, and Katsushi Ikeuchi.

(Continued)

*Primary Examiner*—Andrew W. Johns
(74) *Attorney, Agent, or Firm*—Staas & Halsey LLP

(57) ABSTRACT

Each frame of time-series pictures shot by a camera is converted to a spatial differential frame picture by the following equations:

$$H(i,j) = \Sigma |G(i+di, j+dj) - G(i,j)|/(G_{i,j,max}/G_{max}),$$

$$I = G_{max}/\{1 + \exp(-0.02(H-80))\},$$

where $\Sigma$ denotes a sum over $di = -1$ to 1 and $dj = -1$ to 1, $G_{i,j,max}$ denotes the maximum pixel value of 3×3 pixels having its center at the i-th row and j-th column, and $G_{max}$ denotes the assumable maximum value 255 of the pixel value $G(i, j)$. Moving objects at a time t is discriminated based on a correlation between spatial differential frame pictures at times (t−1) and t and a discrimination result of moving objects included in the spatial differential frame picture at the time (t−1).

17 Claims, 16 Drawing Sheets

OTHER PUBLICATIONS

European Search Report issued Apr. 28, 2006, in European Patent Application No.: 05010278.9-2215.
European Search Report issued Apr. 28, 2006, in European Patent Application No.: 05010279.7-2215.
Shunsuke Kamijo, et al. "Traffic Monitoring and Accident Detection at Intersections." IEEE Transactions on Intelligent Transportation Systems, vol. 1, No. 2, Jun. 2000 (pp. 108-118).
Shunsuke Kamijo, et al. "Incident Detection at Intersections Utilizing Hidden Markov Model." 6th World Congress on Intelligent Transport Systems, Nov. 8-12, 1999, Toronto, Canada (pp. 1-10).
Shunsuke Kamijo, et al. "Occlusion Robust Vehicle Tracking Utilizing Spatio—Temporal Markov Random Field Model." 7th World Congress on Intelligent Transport Systems, Nov. 6-9, 2000, Turin, Italy (5pp).
Tieniu Tan, "Locating and recognizing road vehicles", Optical Engineering, vol. 37, No. 1, (Jan. 1998), XP000736284, pp. 202-207.
Sylvia Gil et al., "Feature Selection for object tracking in traffic scenes", SPIE vol. 2344 Intelligent Vehicle Highway Systems (1994), XP000689133, pp. 253-266.

* cited by examiner

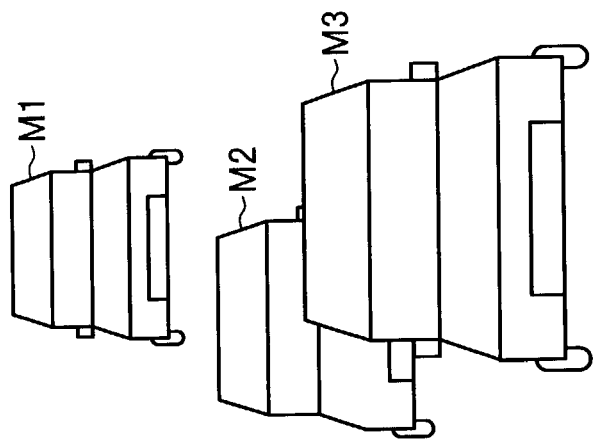
FIG.7(C) TIME (t+1)
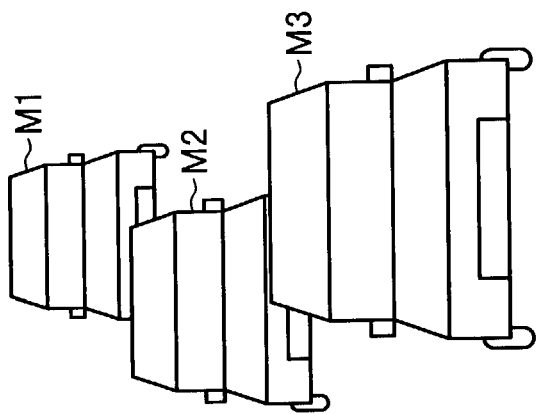
FIG.7(B) TIME t
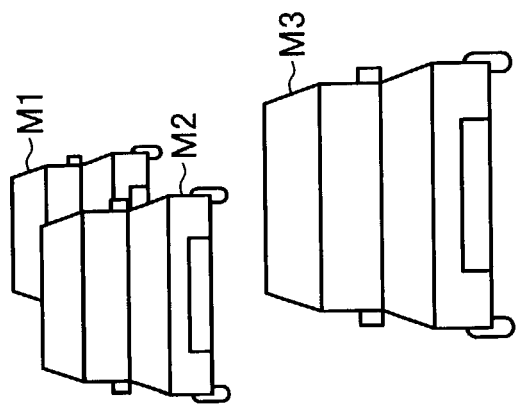
FIG.7(A) TIME (t-1)

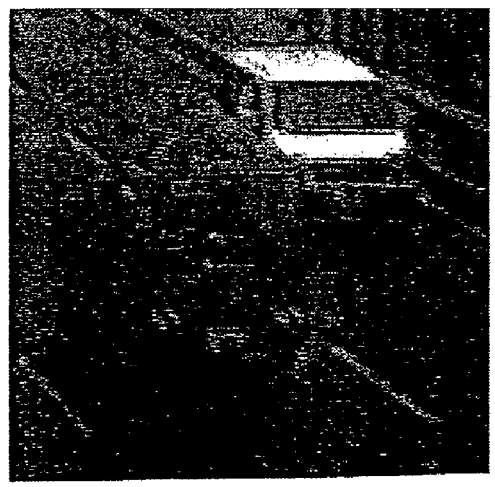
FIG.14(A)
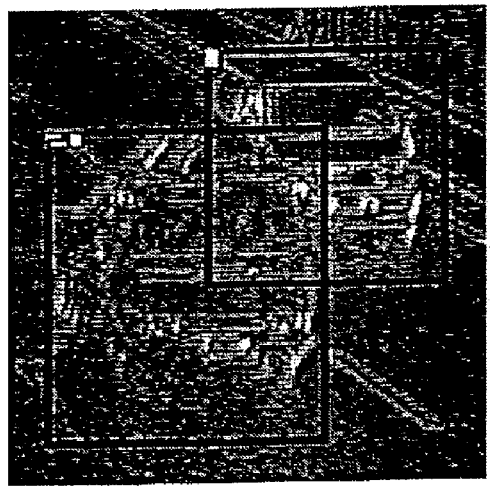
FIG.14(B)
FIG.14(C)

METHOD AND APPARATUS FOR TRACKING MOVING OBJECTS IN SPATIAL DIFFERENTIAL FRAME PICTURES

CROSS-REFERENCE TO RELATED APPLICATIONS

This application is based upon and claims the benefit of priority from the prior Japanese Patent Application No. 2002-62439, filed on Mar. 7, 2002, the entire contents of which are incorporated herein by reference.

This application is related to the co-pending patent application Ser. No. 10/120,374 entitled "METHOD AND APPARATUS FOR PROCESSING PICTURES OF MOBILE OBJECT" filed on Apr. 12, 2002 by Shunske Kamijo, Masao Sakauchi, and Katsushi Ikeuchi.

BACKGROUND OF THE INVENTION

1. Field of the Invention

The present invention relates to a method and apparatus for tracking moving objects (i.e., movable things such as cars, bicycles, and animals) in pictures by processing time-series pictures.

2. Description of the Related Art

Early detection of a traffic accident can not only enhance a success rate in life saving by speedy rescue operation, but also alleviate accident-related traffic congestion by speedup of the police inspection at the site. Therefore, various kinds of automation in recognition of traffic accident are expected. In order to achieve a high recognition rate of traffic accidents, it is necessary to correctly track moving objects by processing pictures captured by a camera.

In tracking moving objects, it is particularly difficult to differentiate overlapped moving objects in a picture from each other and to track moving objects without being affected by variations in luminance of the moving objects due to such ones as the shade of clouds or buildings.

The former difficulty can be overcome by a method of calculating a spatio-temporal correlation based on a spatio-temporal Markov model, which has been disclosed in the publication of JP 2001-148019-A whose inventors are the same as those of the present application. The latter difficulty can be overcome by using a differential picture (G. L. Gimel'farb, "Texture Modeling by Multiple Pairwise Pixel Interactions", IEEE trans. PAMI, Vol. 18, No. 11, 1996, pp 1110–1114).

However, there are still technical challenges in achieving a high success rate of tracking moving objects with a suitable method of converting the differential picture for incorporation into the correlation-based method.

SUMMARY OF THE INVENTION

Accordingly, it is an object of the present invention to provide a method and apparatus for tracking moving objects whereby a high success rate of tracking moving objects can be achieved irrespective of overlapping between the moving objects in pictures and variations in luminance of the moving objects in the pictures.

In one aspect of the present invention, there is provided a moving object tracking method of processing first time-series pictures to track moving objects therein, the method comprising the steps of:

(a) generating second time-series pictures by converting the first time-series pictures to respective spatial differential frame pictures; and (b) discriminating moving objects at a time $t2$ based on a correlation between one of the spatial differential frame pictures at a time $t1$ adjacent to the time $t2$ and another of the spatial differential frame pictures at the time $t2$, and also based on a discrimination result of moving objects included in said one of the spatial differential frame pictures at the time $t1$.

According to this configuration, owing to the step (a), the second time-series pictures is little affected by variations in luminance, and since the process of step (b) is performed for the second time-series pictures, it is possible to track moving objects with a high success rate even if the luminance of the moving objects varies in pictures or moving objects are overlapped with each other in pictures.

In the step (a), for example, a value of a pixel of interest in any of the spatial differential frame pictures is determined by converting a value of a corresponding pixel of interest of corresponding one of the first time-series pictures to a value I associated with a value H proportional to a value obtained by dividing a differential value between the value of the corresponding pixel of interest and values of its neighboring pixels by a maximum value among the corresponding pixel of interest and the neighboring pixels. Thereby, even if the pixel value is low and thus the differential value is small, it is possible to obtain edge information which is almost equivalent to that obtained in a case where the pixel value is high and the differential value is large, consequently increasing the success rate of tracking moving objects.

Further in the step (a), for example, if the value H is within a predetermined range, then the value I is determined by an approximate linear transformation of the value H, or else, the value I is determined by converting the value H to a value which is suppressed so as not to exceed an assumable maximum value Gmax of a pixel of the spatial differential frame picture. This allows the bit size of the value I to be reduced with little reduction of edge information included in the distribution of H, achieving a speedy image processing.

Other aspects, objects, and the advantages of the present invention will become apparent from the following detailed description taken in connection with the accompanying drawings.

BRIEF DESCRIPTION OF THE DRAWINGS

FIG. 7 is an illustration of a case where moving objects are frequently overlapped with each other in series pictures;

FIG. 14(A) is a portion of a picture captured at a low camera angle by a camera disposed above an expressway;
FIG. 14(B) is a picture converted from that of FIG. 14(A) at the image conversion section of FIG. 2 and overlaid with square frames within which respective moving objects recognized by the moving object tracking apparatus of FIG. 2 are included;
FIG. 14(C) is an object map corresponding to the picture of FIG. 14(B)

DESCRIPTION OF THE PREFERRED EMBODIMENT

Figure 1:
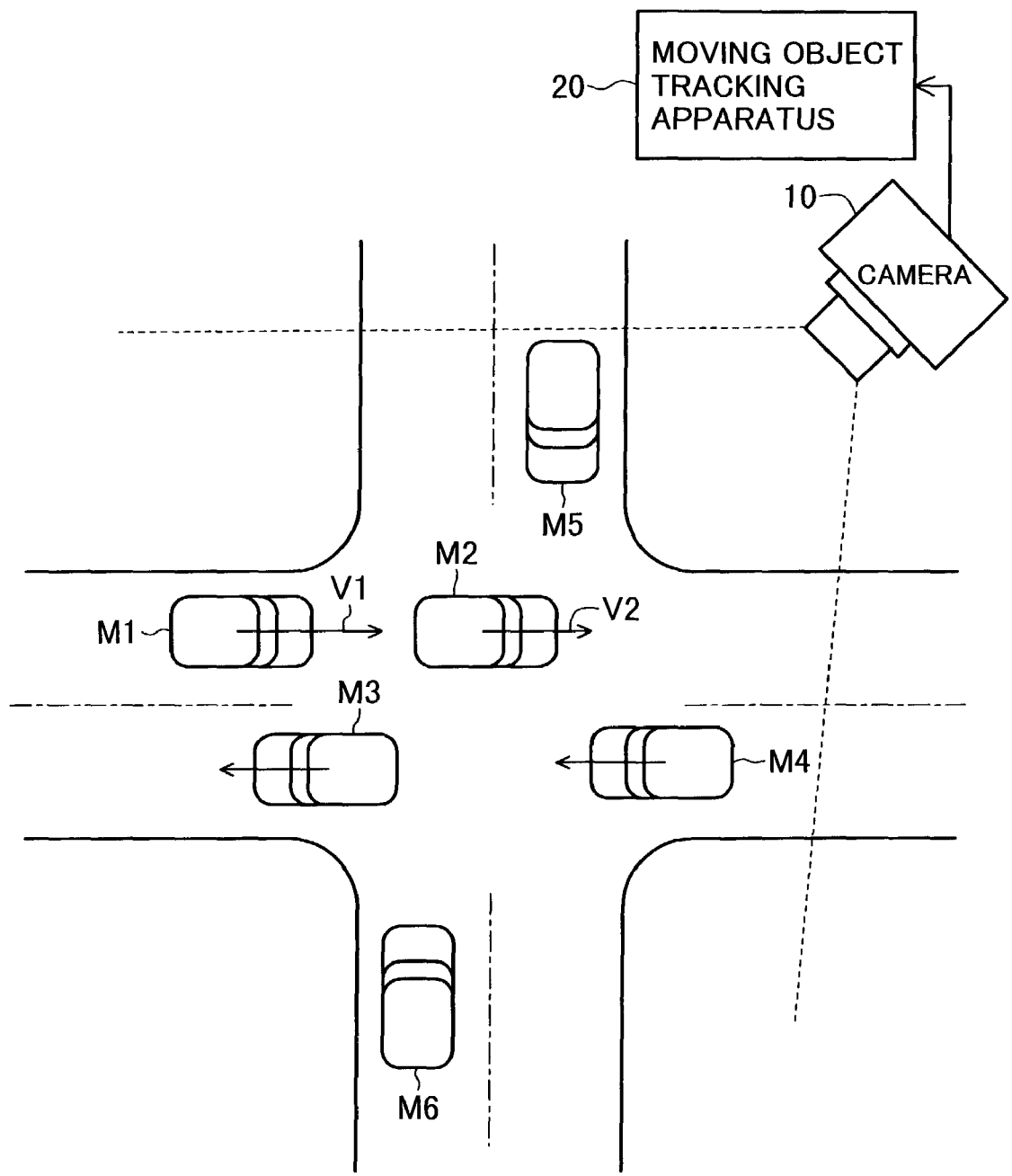
FIG. 1 is a schematic diagram showing an intersection and a moving object tracking apparatus, placed at the intersection, of an embodiment according to the present invention.

Referring now to the drawings, wherein like reference characters designate like or corresponding parts throughout several views, a preferred embodiment of the present invention will be described below.

FIG. 1 is a schematic diagram showing an intersection and a moving object tracking apparatus, placed at the intersection, of an embodiment according to the present invention.

This apparatus is provided with an electronic camera 10 capturing the intersection and outputting the captured picture signal and a moving object tracking apparatus 20 processing pictures to automatically track moving objects.

Figure 2:
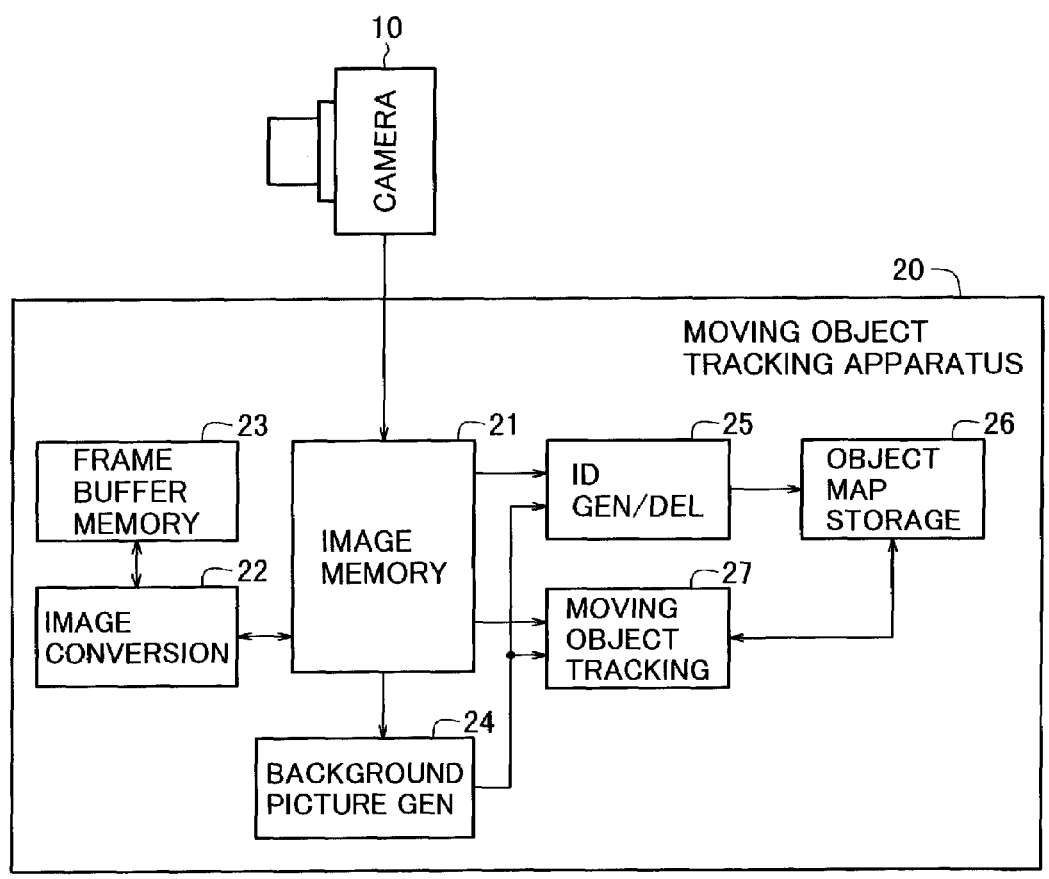
FIG. 2 is a functional block diagram of the moving object tracking apparatus of FIG. 1.

FIG. 2 is a functional block diagram of the moving object tracking apparatus 20. Of constituents of the moving object tracking apparatus 20, each constituent other than storage sections can also be constructed of computer software, a dedicated hardware, or a combination of computer software and a dedicated hardware.

Time series pictures shot by the electronic camera 10 are stored into an image memory 21 at a rate of, for example, 12 frames/sec.

The image memory 21 has a storage capacity of 3 frames or more, and the oldest frame picture is replaced with a new frame picture.

An image conversion section 22 copies each of frame pictures in the image memory 21 into a buffer memory 23, and with making reference to the copied frame picture, converts the corresponding frame picture in the image memory 21 to a spatial differential frame picture. This conversion is performed in two steps as follows:

Letting $G(i, j)$ be a pixel value (brightness value) in the i-th row and j-th column of the original frame picture, a firstly converted pixel value $H(i, j)$ in the i-th row and j-th column is expressed by the following equation.

$$H(i,j)=\Sigma_{neighberpixels}|G(i+di,j+dj)-G(i,j)| \quad (1)$$

Here, $\Sigma_{neighberpixels}$ denotes a sum over $di=-c$ to $c$ and $dj=-c$ to $c$ wherein c is a natural number. For example, when c=1, it denotes a sum over values of 8 pixels neighboring on the pixel of the i-th row and j-th column. As the luminance varies, the pixel value $G(i, j)$ and its neighboring pixel values $G(i+di, j+dj)$ vary in the same way. Therefore, the picture of $H(i, j)$ is not affected by variations in the luminance.

Generally, the higher the pixel value is, the higher the absolute value of the difference between the pixel value and a neighboring pixel value is. Even if the pixel value is low and thus the difference is small, it is desirable to obtain edge information almost equivalent to edge information obtained when the pixel value is high and the difference is large, in order to increase the success rate of tracking moving objects. Thus, $H(i, j)$ is normalized as follows:

$$H(i,j)=\Sigma_{neighberpixels}|G(i+di,j+dj)-G(i,j)|/(Gi,j,max/Gmax) \quad (2)$$

where, $Gi,j,max$ denotes the maximum value among original pixel values used in the calculation of $H(i, j)$. For example, when c=1, $Gi,j,max$ is the maximum pixel value of 3×3 pixels having its center at the i-th row and j-th column. Gmax denotes the assumable maximum value of the pixel value $G(i, j)$. For example, when the pixel value is expressed in 8 bits, Gmax is 255. The following description will be given with reference to the case where c=1 and Gmax=255.

The assumable maximum value of $H(i, j)$ varies according to the moving objects. For example, when $G(i, j)$=Gmax and all the 8 neighboring pixels around the pixel of i-th row and j-th column have a pixel value of 0, $H(i, j)$=8 Gmax and thus $H(i, j)$ cannot be expressed in 8 bits.

On the other hand, a histogram made for the value of $H(i, j)$ on the edge portion of moving objects shows that most values of H in the edge portion are in the range of 50 to 110. That is, as the value of H is higher than about 110, edge information quantity for the tracking of moving object is smaller, and thus it becomes less important.

Accordingly, it is desirable to suppress parts having a high value of H so as to reduce the bit length of the converted pixel and thereby attain a high image processing speed. Thus, the second conversion is performed by converting $H(i, j)$ to $I(i, j)$ with the following equation having a sigmoid function.

$$I=Gmax/\{1+\exp(-\beta(H-\alpha))\} \quad (3)$$

This sigmoid function has a good linearity for H being around $\alpha$. Therefore, the threshold value $\alpha$ is set to the most frequent value, e.g., 80 in the frequency distribution of the values of H having edge information.

Figure 3:
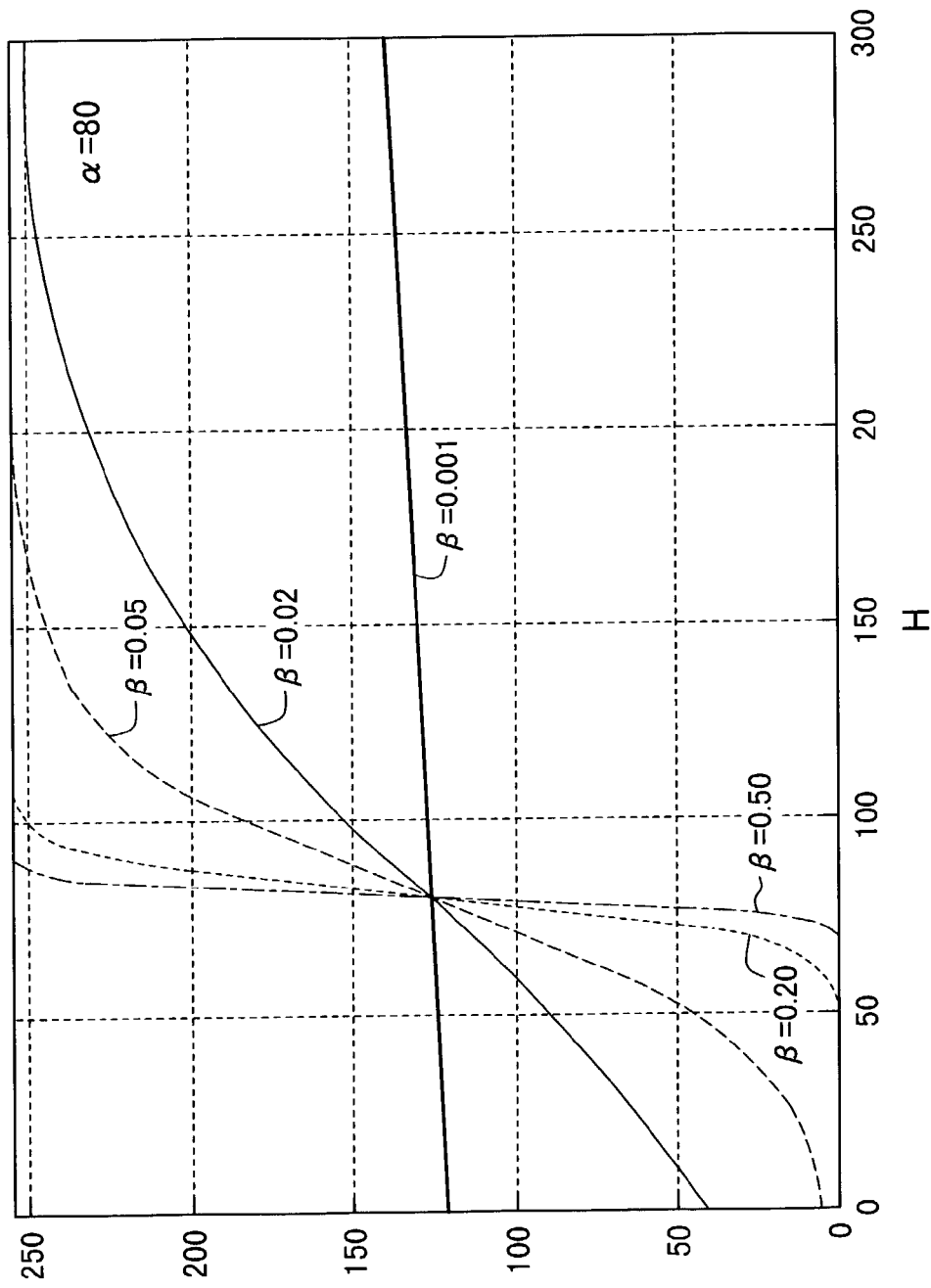
FIG. 3 is a graph showing a sigmoid function used in the image conversion section of FIG. 2.

FIG. 3 shows graphs of I versus H in a case where Gmax=255 and $\alpha$=80, and in cases where $\beta$=0.001, 0.02, 0.05, 0.20 and 0.50. The desirable range of $\beta$ is described later in relation to the success rate of moving object tracking actually performed.

The image conversion section 22 converts the picture of pixel values $G(i, j)$ to a picture of pixel values $I(i, j)$ based on the above equations (2) and (3).

Figure 4A:
FIG. 4(A) is a copy of an original picture captured at an intersection without a shadow of buildings.
Figure 4B:
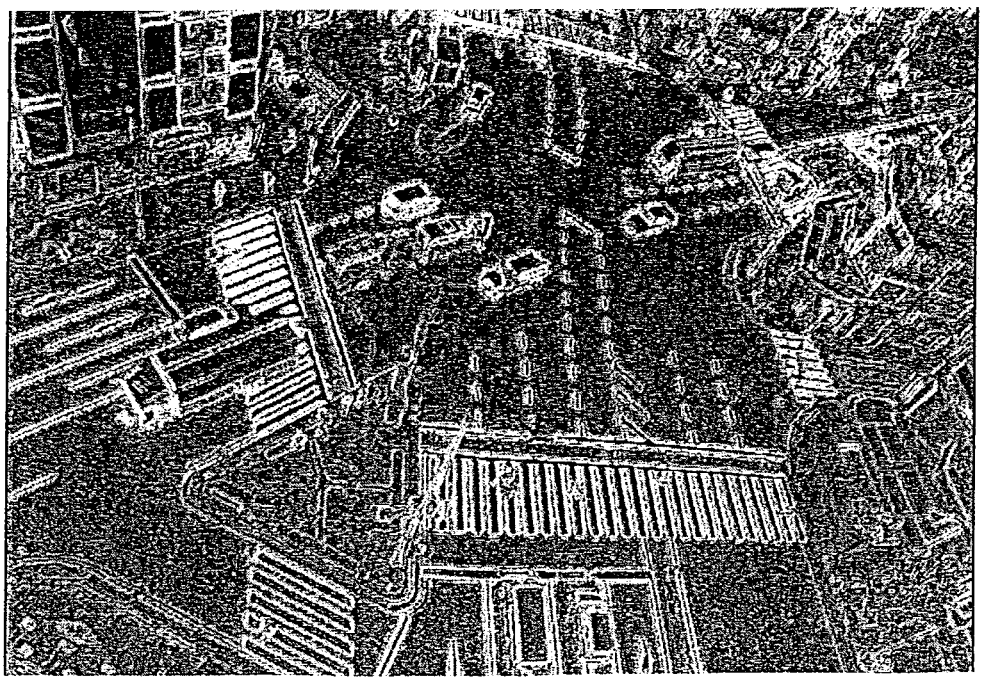
FIG. 4(B) is a differential picture determined by converting the picture of FIG. 4(A) at the image conversion section of FIG. 2.
Figure 5A:
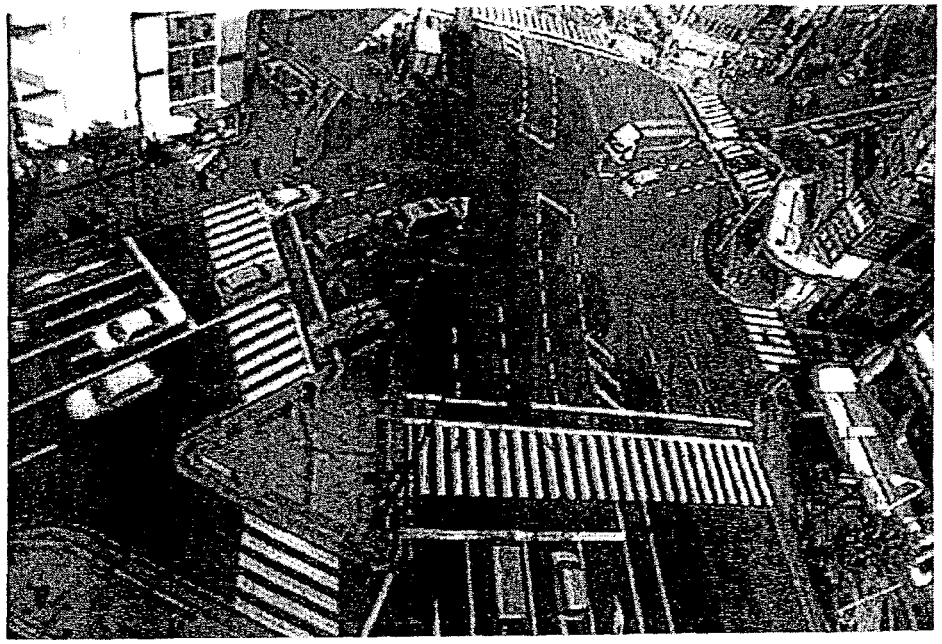
FIG. 5(A) is a copy of an original picture captured at the intersection with a shadow of buildings.
Figure 5B:
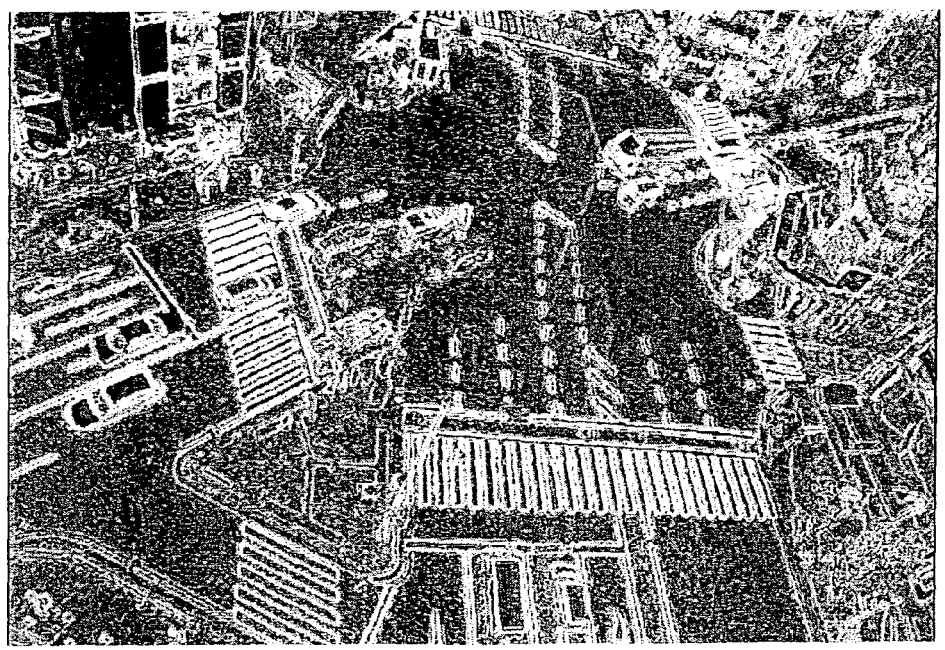
FIG. 5(B) is a spatial differential picture determined by converting the original pictures of FIG. 5(A) at the image conversion section of FIG. 2.

FIGS. 4(A) and 5(A) are copies of original pictures captured at a intersection without and with a shadow of buildings, respectively. FIGS. 4(B) and 5(B) are spatial differential pictures obtained by converting the original pictures of FIGS. 4(A) and 5(A), respectively, at the image conversion section 22. These pictures show that the differential pictures are little affected by variations in the luminance, obtaining characteristics of moving objects.

Each of a background picture generation section 24, an ID generation/deletion section 25, and a moving object tracking section 27 performs a process based on spatial differential frame pictures in the image memory 21. Hereinafter, for abbreviation, the spatial differential frame picture is referred to as a frame picture.

The background picture generation section 24 is provided with a storage section and a processing section. This processing section accesses the image memory 21 to prepare histograms of respective pixels, each histogram having corresponding pixel values of all the frame pictures, for example, over the past 10 minutes to generate a picture with no moving object therein as a background picture whose each pixel value is the mode of the corresponding histogram, and to store the background picture into the storage section. This processing is repeated periodically to update the background picture.

Figure 6:
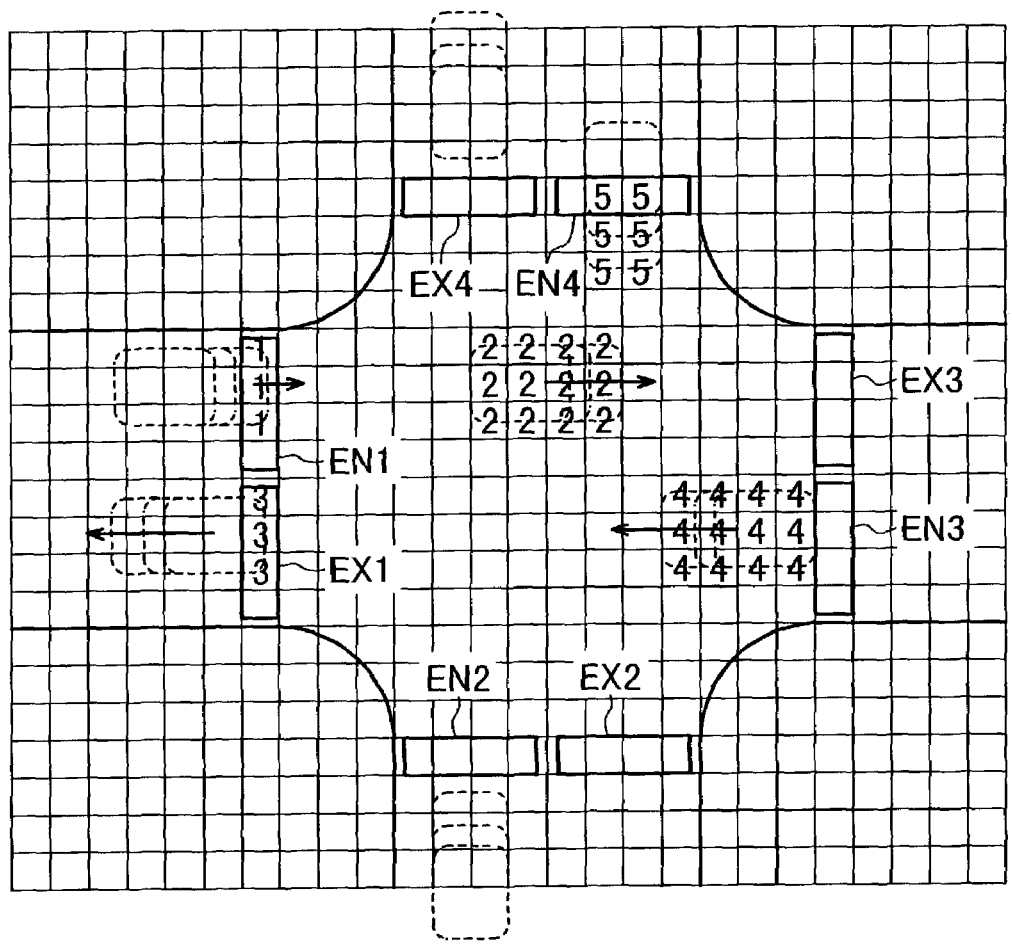
FIG. 6 is an illustration of IDs of moving objects assigned to blocks and slits defined at four entrances and four exits of the intersection.

As shown in FIG. 6, data of the positions and sizes, in a frame picture, of slits EN1 to EN4 disposed at 4 entrances of the intersection and slits EX1 to EX4 disposed at 4 exits of the intersection, are in advance set in the ID generation/deletion section 25. The ID generation/deletion section 25 reads picture data within the entrance slits EN1 to EN4 from the image memory 21 to determine whether or not a moving object exists in each block in each entrance slit. Squares in a mesh of FIG. 4 are respective blocks, each block is of a size of, for example, 8×8 pixels, and in a case where one frame is constituted of 480×640 pixels, one frame is divided into 60×80 blocks. Whether or not a moving object exists in a block is determined based on whether or not a total sum of differences between pixels in a block and corresponding respective pixels of the background picture is greater than a predetermined value. The determination is also performed in the moving object tracking section 27.

The ID generation/deletion section 25 assigns a new cluster identification codes ID to a block when it is determined that a moving object exists in the block. When it is determined that a moving object exists in a block adjacent to another block to which ID has been assigned, ID generation/deletion section 25 assigns the same ID as assigned to said another block to the adjacent block. Said another block to which ID has been assigned may be one adjacent to an entrance slit. For example, in FIG. 6, an ID of 1 is assigned to respective blocks in an entrance slit EN1 in which a moving object exists, and an ID of 5 is assigned to respective blocks in an entrance slit EN4 in which a moving object exists.

Assignment of ID is performed to corresponding blocks in an object map storage section 26. In the above case, the object map storage section 26 is for storing object maps each having 60×80 blocks in the above case, and each block has, as block information, a flag indicating whether or not an ID has been assigned, and an ID number and a block motion vector described later when the ID has been assigned. Note that ID=0 may be used for indicating no assignment of ID, without using the flag. Further, the most significant bit of ID may be the flag.

For each cluster having passed through an entrance slit, the moving object tracking section 27 assigns the same ID to blocks located in a moving direction, and deletes the same ID of blocks located in a direction opposite to the movement, that is, performs a tracking process for each cluster. The moving object tracking section 27 performs the tracking process for each cluster as far as it is within an exit slit.

The ID generation/deletion section 25 further checks whether or not an ID is assigned to the blocks in the exit slits EX1 to EX4 on the basis of contents of the object map storage section 26 and, if assigned, deletes the ID when the cluster having the ID has passed though an exit slit. For example, when transition has been performed from a state where an ID is assigned to blocks in the exit slit EX1 in FIG. 6 to a state where no ID is assigned thereto, the ID of 3 is deleted. The deleted ID can be used as the next ID to be generated.

The moving object tracking section 27, as described later, generates an object map at a time t on the basis of an object map and a frame picture at a time (t−1) and a frame picture at the time t.

In a case where moving objects are shot from the front thereof at a low camera angle with respect to a road surface in order to shoot a wide area with one camera to track the moving objects, it is frequent that the moving objects are overlapped with each other in pictures as shown in (A) to (C) of FIG. 7.

Figure 8:
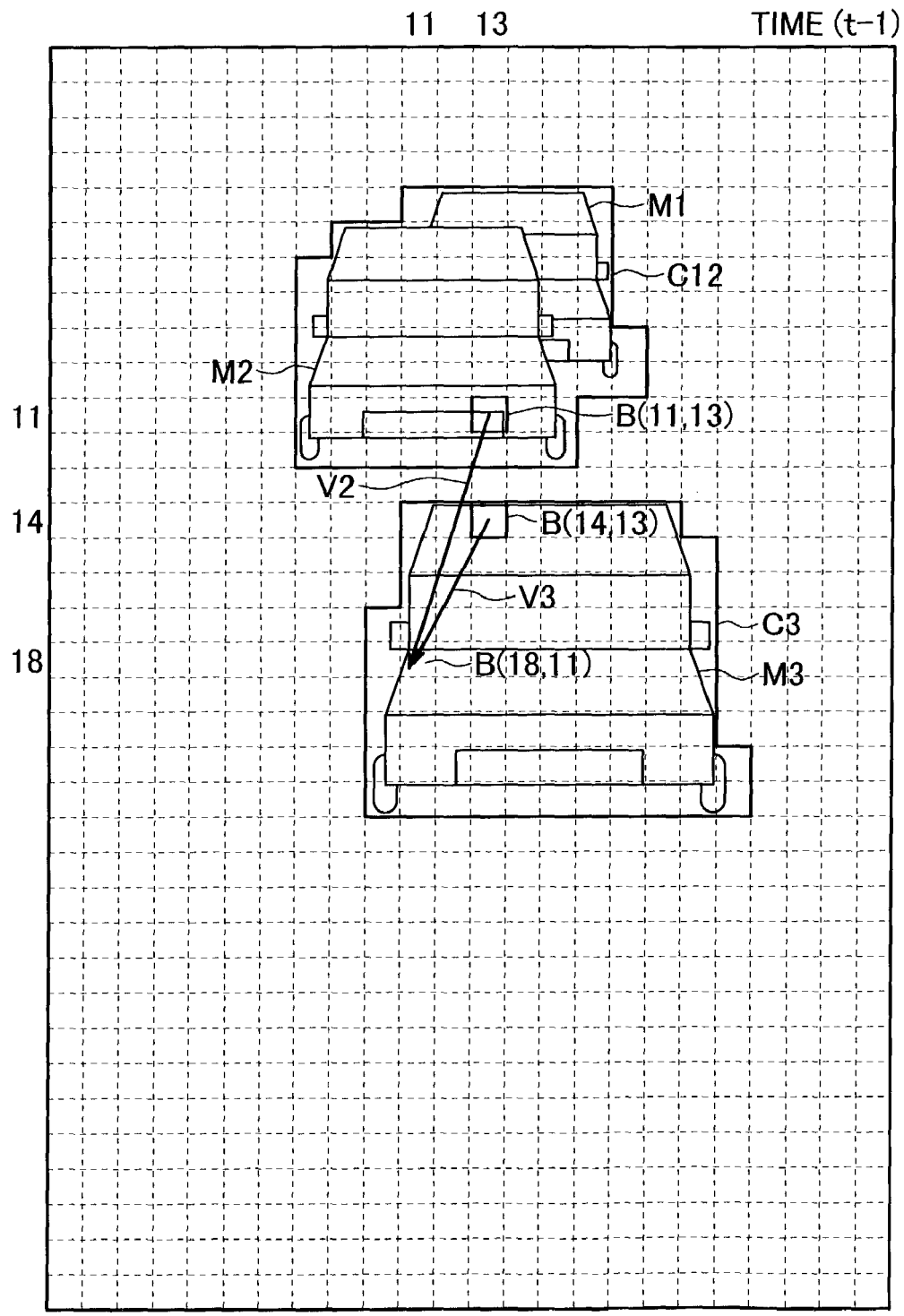
FIG. 8 is an illustration of producing an object map.
Figure 9:
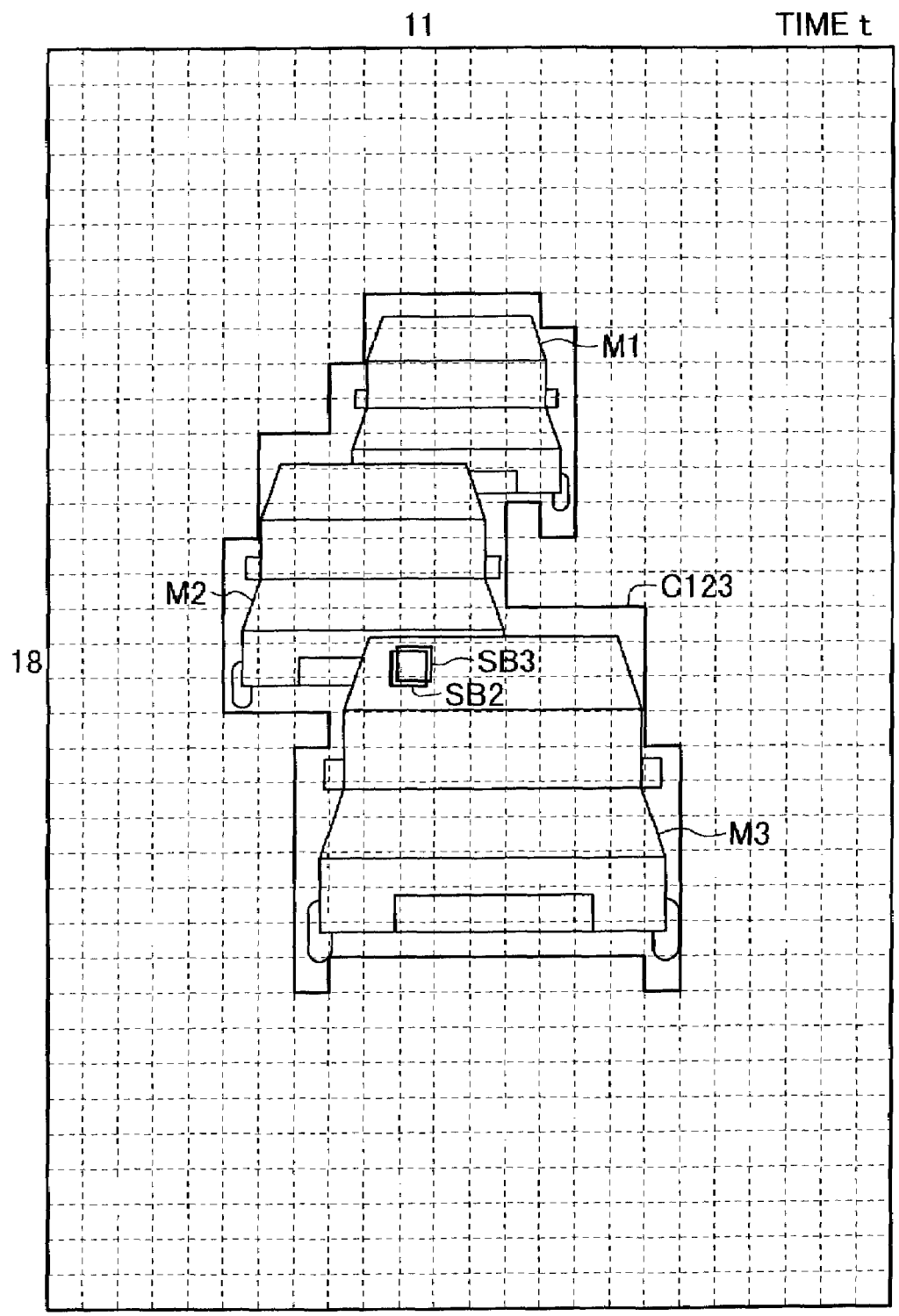
FIG. 9 is an illustration of producing an object map.

FIGS. 8 and 9 show enlarged pictures of (A) and (B) of FIG. 7, respectively. Dotted lines are for dividing a picture into blocks. In FIG. 8, overlapped moving objects M1 and M2 correspond to one cluster C12 in the object map storage section 26 of FIG. 2, and let us assume that the moving objects M1 and M2 are not yet discriminated from each other. On the other hand, a cluster C3 corresponds to one moving object M3.

A block in the i-th row and j-th column at a time t is denoted by B(t: i, j). As shown in FIG. 8, the motion vectors of blocks B (t−1: 11, 13) and B (t−1: 14, 13) are denoted by V2 and V3, respectively. The tips of the motion vectors V2 and V3 both exist in a block (t−1: 18, 11). In a picture at the time t of FIG. 9, boxes SB2 and SB3 correspond to regions to which the blocks B (t−1: 11, 13) and B (t−1: 14, 13) in the picture of FIG. 8 are moved by the motion vectors V2 and V3, respectively.

Figure 10:
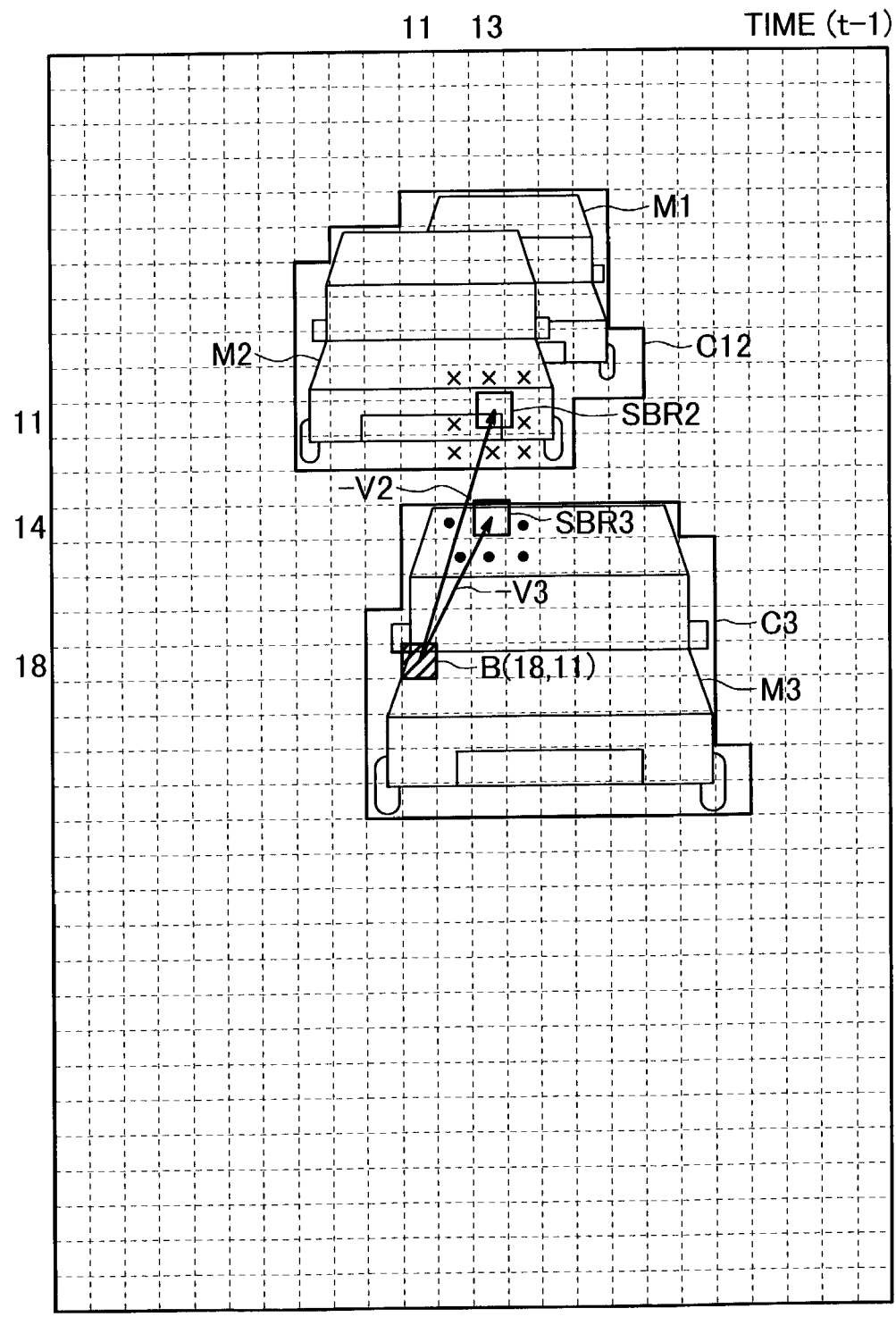
FIG. 10 is an illustration of producing an object map.

Next, the motion vectors V2 and V3 are translated such that the tips of the motion vectors V2 and V3 both coincide with the center of the block B (18, 11). Then, the translated motion vectors V2 and V3 are inversed to obtain −V2 and −V3, respectively, as shown in FIG. 10. Next, the hatched block B (t−1: 18, 11) is moved by the vectors −V2 and −V3 to obtain boxes SBR2 and SBR3, respectively, as shown in FIG. 10. Images in the boxes SBR2 and SBR3 are estimated ones on the assumption that an image in the block B (t: 18, 11) of FIG. 11 would have belonged to the clusters C12 and C3 of FIG. 10 at the time (t−1). IDs of the clusters C12 and C13 are denoted by ID12 and ID3, respectively.

Figure 11:
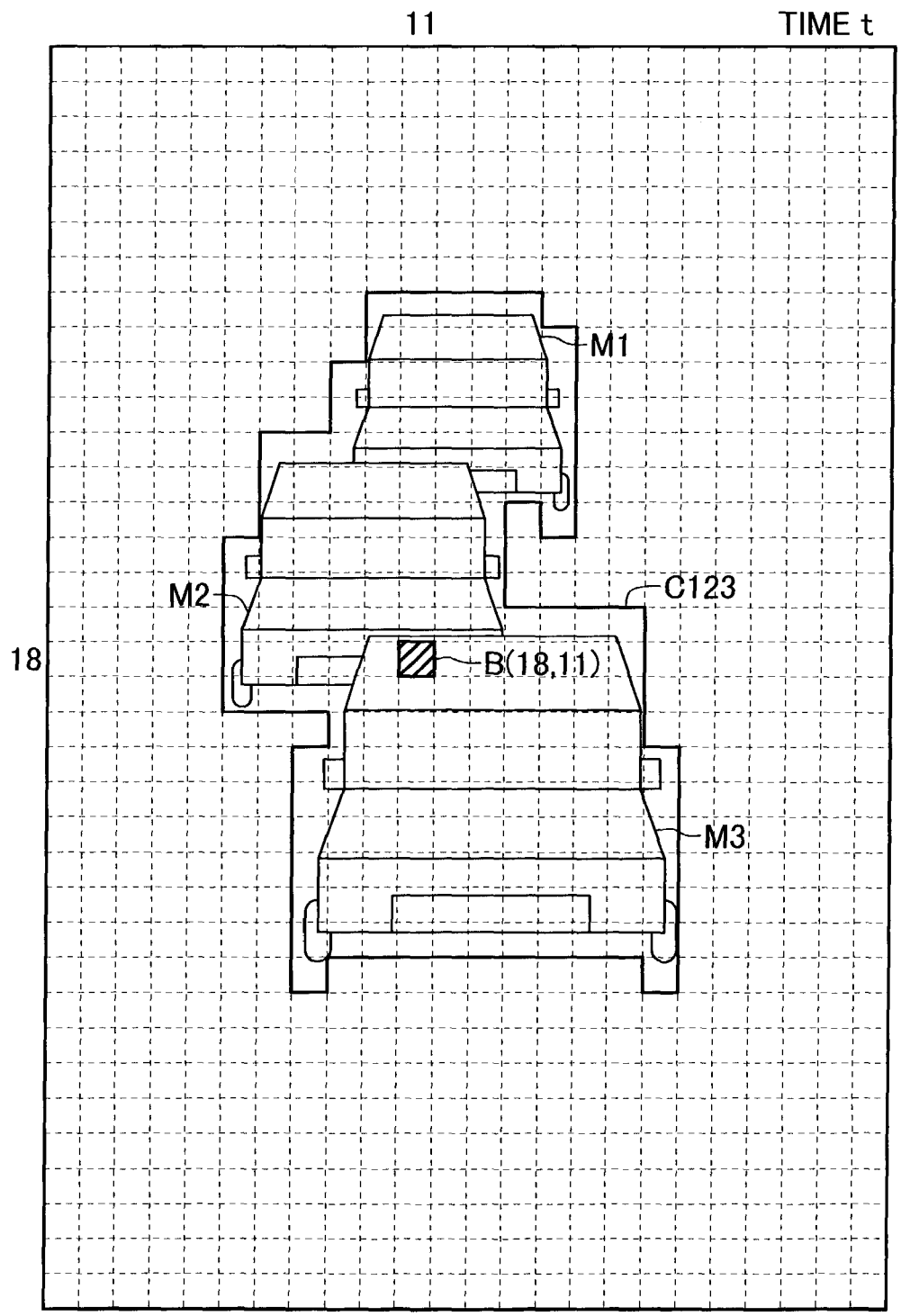
FIG. 11 is an illustration of producing an object map.

An evaluation value UD associated with a similarity (correlation) between the image in the box SBR2 of FIG. 10 and the image in the block B(t: 18, 11) is calculated with the following equation, and the value is denoted by UD (ID12).

$$UD = \Sigma |SP(t-1: i,j) - BP(t: i,j)| \quad (4)$$

where $SP(t-1: i, j)$ and $BP(t: i, j)$ denote pixel values on the i-th row and the j-th column in the box SBR2 of FIG. 10 and in the block B(t: 18, 11) of FIG. 11, respectively, and $\Sigma$ denotes a sum over i=1 to 8 and j=1 to 8 (a sum over all pixels in a block or box). The smaller the evaluation value UD is, the higher the correlation is.

Likewise, an evaluation value UD associated with a correlation between the image in the block SBR3 of FIG. 10 and the image in the block B(t: 18, 11) of FIG. 11 is calculated, and the value is denoted by UD(ID3).

In the case of FIGS. 10 and 11, UD(ID3)<UD(ID12) holds and thereby ID3 is assigned to the block B(t: 18, 11).

In such a way, by using a motion vector of each block, different IDs can be assigned to blocks included in the cluster C123 including a plurality of moving objects at the time t, and thereby one cluster C123 can be divided into subclusters with different IDs.

How to find out the block B(t−1: 11, 13) in the cluster C12 and the block B(t−1: 14, 13) in the cluster C3 both corresponding to the block B (t: 18, 11) belonging to the cluster C123 of FIG. 9, is as follows: That is, letting a vector from the center of the block B(t−1: i, j) to the center of the block B(t−1: 18, 11) be V(18−i, 11−j) and a motion vector of the block B (t−1: i, j) be V(t−1: i, j), it is equivalent to find out a block B(t−1: i, j) having V (t−1: i, j) satisfying the following expression:

$$|V(18-i,11-j)-V(t-1:i,j)|<\Delta V$$

where ΔV is a constant whose value is, for example, three times the number of pixels on one side of a block. In a case where a plurality of blocks corresponding to the block B(t: 18, 11) exist in the cluster C12 or in a case where a plurality of blocks corresponding to the block B(t: 18, 11) exist in the cluster C3, the evaluation value is determined for each of such blocks and ID corresponding to the least evaluation value is assigned to the block B(t: 18, 11).

The above procedure is applied to other blocks belonging to the cluster C123 of FIG. 9 in a similar manner.

In the above case where ID3 is assigned to the block B(t: 18, 11), the motion vector of the block can be estimated to be almost equal to the vector V3. In order to obtain the motion vector of the block B(t: 18, 11) more accurately, the box SBR3 is shifted by one pixel at a time in a predetermined range whose center is coincident with that of the box SBR3, the evaluation value is obtained for every shift, and the motion vector of the block B(t: 18, 11) is determined to be a vector whose origin is the center of the box SBR3 when the evaluation value assumes the minimum (the highest correlation) and whose tip is the center of the block B(t: 18, 11). A motion vector of a block at a time t is determined by such a block matching each time when ID is assigned to the block.

In order to estimate the similarity more accurately, amounts described below are also taken into consideration.

A portion of the box SBR3 in FIG. 10 is outside the cluster 3 and as the outside area is wider, it can be considered that a probability that ID of the block B(t: 18, 11) of FIG. 11 is ID3 is low. Therefore, assuming that ID of the block B(t: 18, 11) is equal to ID3, the number S (t−1) of pixels belonging to the cluster C3 in the box SBR3 is determined, and an evaluation value U associated with a correlation between the image in the box SBR3 of FIG. 10 and the image in the block B(t: 18, 11) of FIG. 11 is calculated with the following equation, and the calculated value is denoted by US(ID3):

$$US=(S(t-1)-64))^2 \qquad (5)$$

The smaller the evaluation value US is, the higher the correlation is. Likewise, assuming that ID of the block B(t: 18, 11) is equal to ID12, the number S of pixels belonging to the cluster C12 in the box SBR2 is determined to calculate the evaluation value US, and the value is denoted by US(ID12). In cases of FIGS. 10 and 11, US(ID12)=0 and US(ID3)>US(ID12) hold.

U=aUD+bUS which is a linear combination of the above equations (4) and (5) is defined as an evaluation function, and it is determined that the smaller the evaluation value U, the higher the similarity is, where a and b are positive constants and determined empirically such that the evaluation of similarity becomes more correct.

For each block of FIG. 11 at the time t, it is determined whether ID12 or ID3 is assigned to in a similar way as described above. Since a probability of a wrong determination is high in a case where the absolute value of a difference of evaluation values |U(ID12)−U(ID3)| is less than a predetermined value, without assigning ID the following amount is considered with respect to the picture at the time t. For example, in a case where it is assumed that ID of the block B(t: 18, 11) of FIG. 11, which has not been determined, is equal to ID3, the number N (t) of blocks assigned ID3 among 8 blocks adjacent to the block B(t: 18, 11) is determined, an evaluation value UN is calculated with the following equation, and the value is denoted by UN(ID3):

$$UN=(N(t)-8)^2. \qquad (6)$$

The smaller the evaluation value UN is, the higher the correlation is. Similarly, in a case where it is assumed that ID of the block B(t: 18, 11) of FIG. 11 is equal to ID12, the number N of blocks assigned ID12 among 8 blocks adjacent to the block B(t: 18, 11) is determined, the evaluation value UN is calculated, and the value is denoted by UN(ID12).

Further, when the error of a motion vector at the time (t−1) determined by block matching is large since almost the same pixel values are distributed, a case can be considered where the absolute value |U(ID12)−U(ID3)| of a difference in evaluation values of the linear combination U=aUD+bUS+cUN of the above equations (4) to (6) is less than a predetermined value, where c is also positive constant. Therefore, by paying attention to motion vectors of blocks in the neighborhood of blocks B(t−1: 14, 13) and B(t−1: 11, 13) corresponding to the block (t: 18, 11), the evaluation of similarity is made more correct. That is, an evaluation value UV is calculated using the following equation which includes a motion vector VC(t)=V3 of the block B(t−1: 14, 13) from time (t−1) to t corresponding to the B(t: 18, 11) on the assumption that the block B(t: 18, 11) has ID3; and motion vectors VBi(t−1), for i=1 to NX and NX=NX3, of blocks (blocks each attached with a small black dot in FIG. 10) which are ones among 8 blocks adjacent to the block B(t−1: 14, 13) and whose ID is equal to ID3, and the evaluation value is denoted by UV(ID3):

$$UV=\Sigma|VC(t)-VBi(t-1)|^2/NX \qquad (7)$$

where Σ denotes a sum over i=1 to NX. The smaller the evaluation value UV is, the higher the correlation is. Similarly, an evaluation value UV is calculated in regard to a motion vector VC=V2 of the block B(t−1: 11, 13) from time (t−1) to t corresponding to the B(t: 18, 11) on the assumption that the block B(t: 18, 11) has ID12; and motion vectors VBj(t−1), for j=1 to NX and NX=NX12, of blocks (blocks each attached with a mark x in FIG. 10) which are ones among 8 blocks adjacent to the block B(t−1: 11, 13) and whose ID is equal to ID12, and the evaluation value is denoted by UV(ID12).

A linear combination of the above equations (4) to (7)

$$U=aUD+bUS+cUN+fUV \qquad (8)$$

is used as the evaluation function and it is determined that the smaller the evaluation value is, the higher the similarity is, where f is also positive constants and determined empirically such that the evaluation of similarity becomes more correct.

Figure 12:
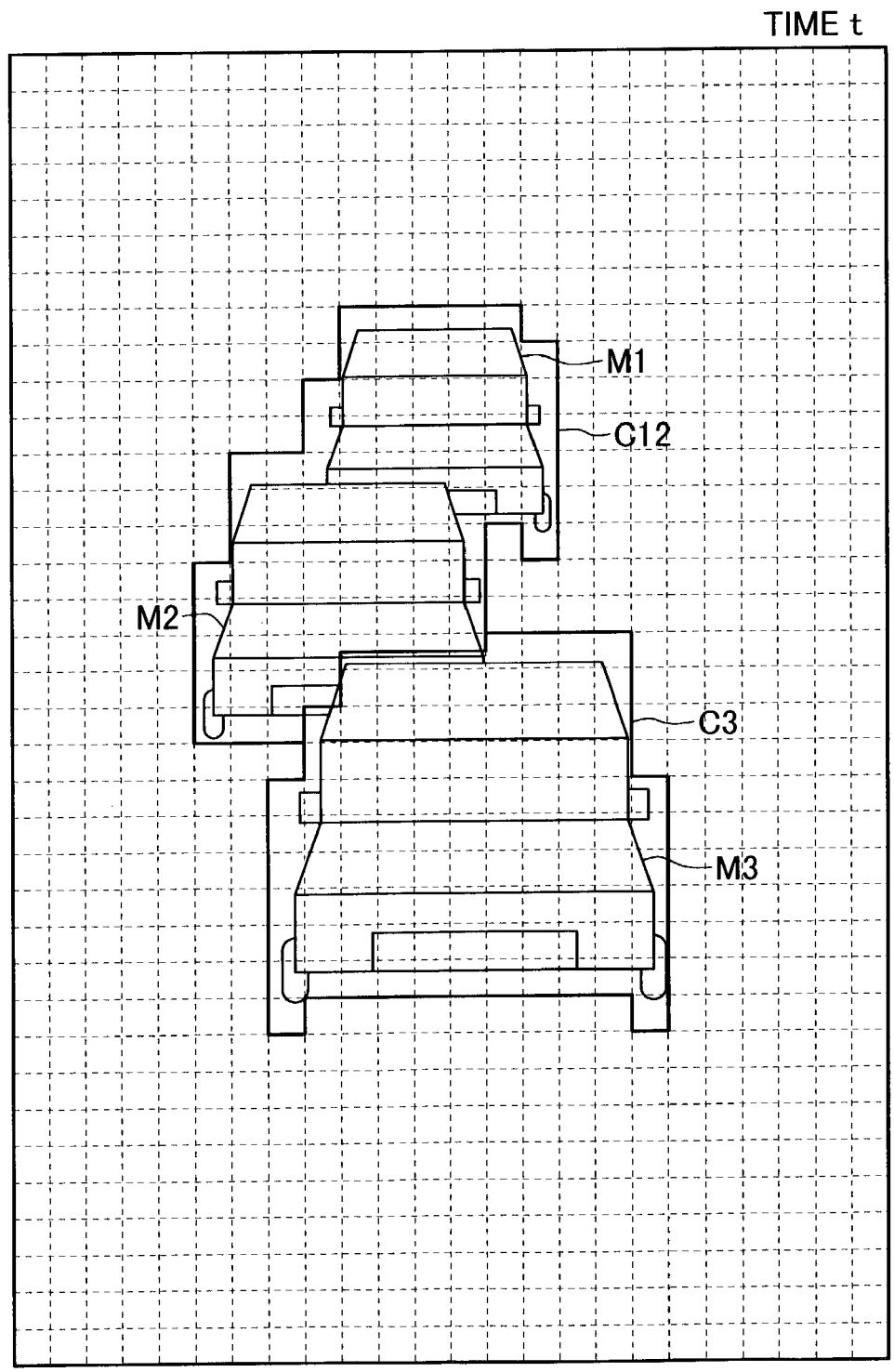
FIG. 12 is an illustration of producing an object map.

In such a way, not only is it determined whether ID is ID12 or ID3 in each block in the cluster C123 of FIG. 11, but a motion vector of each block in the cluster C123 is also determined. That is, an object map at the time t is determined, and as shown in FIG. 12, even if the moving object M2 is overlapped with both of the moving objects M1 and M3, the cluster can be divided into the moving objects with different IDs.

Figure 13:
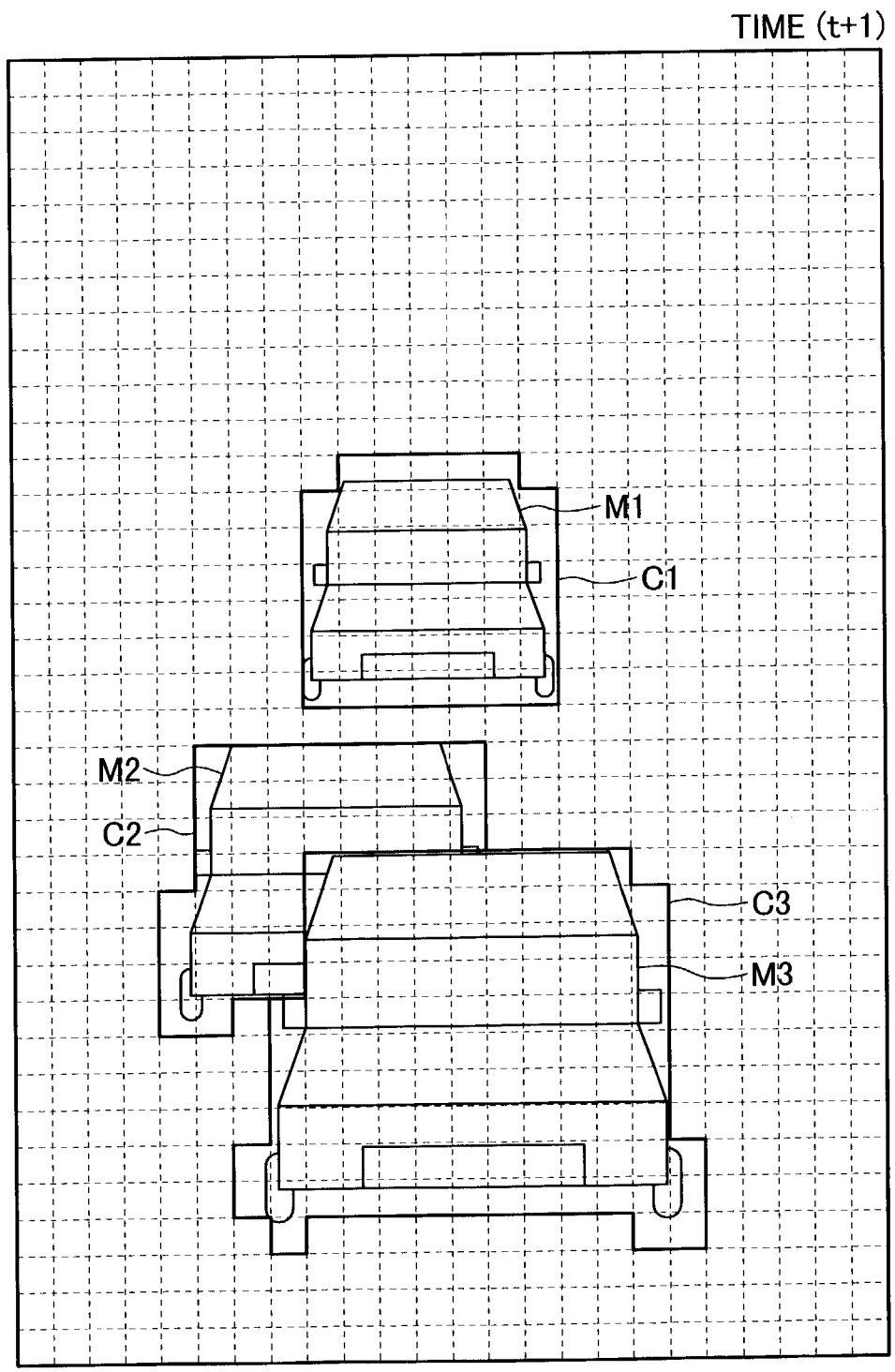
FIG. 13 is an illustration of producing an object map.

Similarly, an object map at a time (t+1) can be determined from the frame picture and object map at the time t and a frame picture at the time (t+1). Since C12 and C3 are discriminated from each other at the time t and the moving object M1 is separated from the moving object M2 in the frame picture at the time (t+1), as shown in FIG. 13, C1 to C3 corresponding to the moving objects M1 to M3 are discriminated from each other at the time (t+1).

Note that an object map X at a time (t−1) may be copied into a work area as an object map Y prior to preparation of an object map at a time t, and a motion vector Vi of each block i whose ID is equal to IDα in the object map X may be replaced with a mean vector (ΣVj)/p, for j=1 to p, in the object map X, where V1 is a motion vector of a block corresponding to the block i and Vj for j=2 to p are motion vectors of blocks having ID=IDα and adjacent to the corresponding block. With such a procedure, in a case where errors of motion vectors are large since a texture in a block is similar to those in adjacent blocks, the errors are reduced. Copying to the work area is for uniquely determining the mean vector.

It is also possible to determine the object map at a time t by the step of:

assuming that a block i in the object map at the time t, for example, block B(18, 11) of FIG. 11, has an ID code IDi and a moving vector Vi, for example, ID3 and V3;

as a unit correlation, calculating a correlation between the image of block i in the frame picture at a time t and the image in a box obtained by moving a box of the block i by a vector −Vi in the frame picture at a time (t−1), for example, the image in SBR3 of FIG. 10; and determining a total sum of unit correlations over the entire blocks at the time t to produce the object map at the time t so that the total sum is maximized.

This algorithm is also effective when t is swapped with (t−1). In this case, when moving objects which have been overlapped are discriminated from each other, the overlapped moving objects can be discriminated from each other by reversing the time.

FIG. 14(A) is a portion of a picture captured at a low camera angle by a camera disposed above an expressway. FIG. 14(B) is a picture converted from that of FIG. 14(A) at the image conversion section 22 of FIG. 2. Rectangles of black lines drawn on the picture of FIG. 14(B) are not related to the actual moving object tracking process, but aim to facilitate persons to catch the outline of the range of the discriminated moving object. FIG. 14(C) is an ID distribution diagram of an object map corresponding to the differential picture of FIG. 14 (B).

Figure 15:
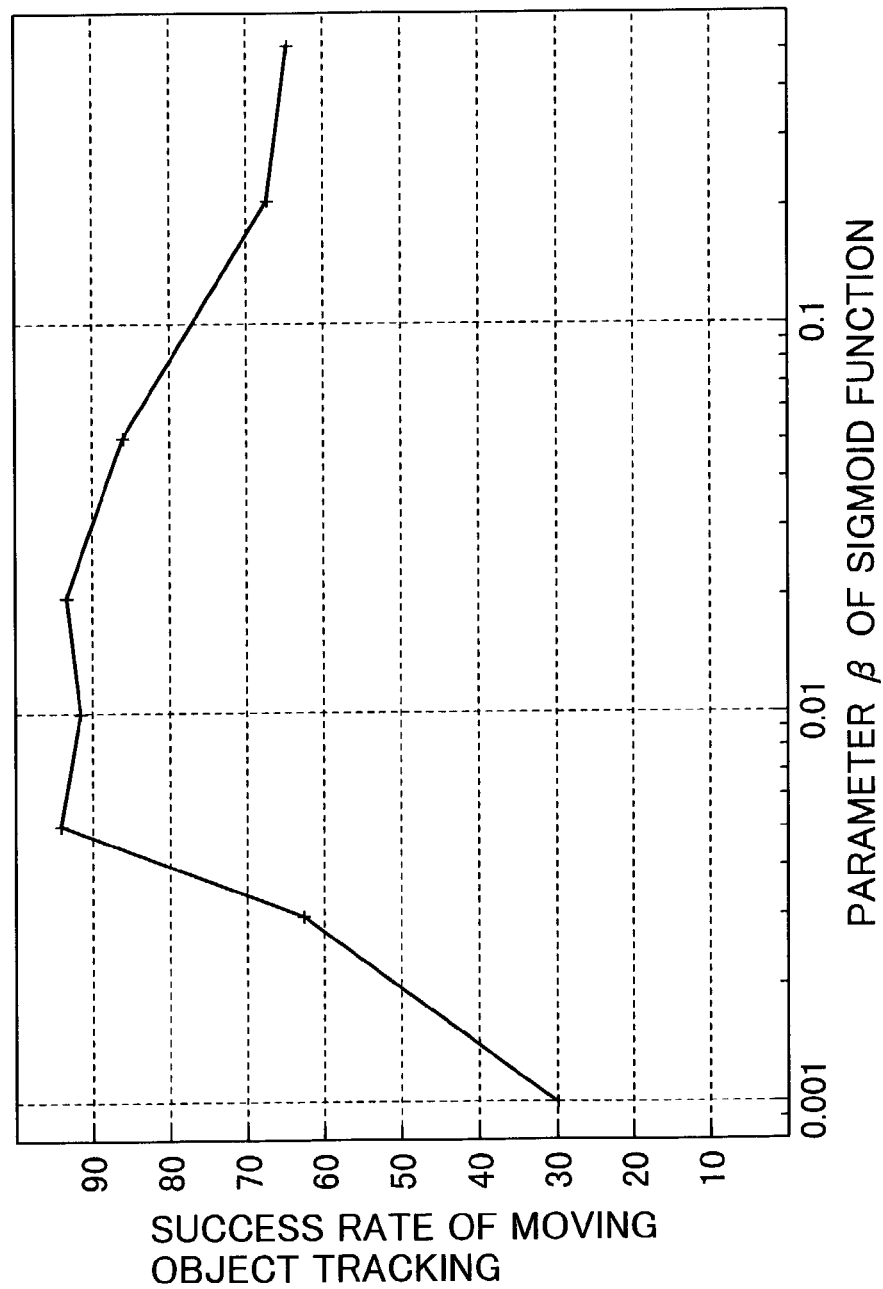
FIG. 15 is a graph showing an experimental result of the success rate of moving object tracking with respect to a parameter $\beta$ in the sigmoid function in a case where the camera of FIG. 2 is disposed above the expressway with the low camera angle.

FIG. 15 is a graph showing an experimental result of the success rate of moving object tracking with respect to the parameter β in the sigmoid function of the above equation (3), in a case where the camera of FIG. 2 is disposed above the expressway at the low camera angle (FIG. 14(A) is a portion of a picture captured by this camera). This result is obtained by adopting α=80, Gmax=255, and 30 frames/sec. In addition, the coefficients a, b, c, and f in the equation (8) are determined by a trial-and-error method such that a=32/1000000, b=1/256, c=1/2, and f=1/4. This graph shows that the success rate of moving object tracking is more than 90% when the value of β is in the range of 0.05 to 0.50.

Although a preferred embodiment of the present invention has been described, it is to be understood that the invention is not limited thereto and that various changes and modifications may be made without departing from the spirit and scope of the invention.

Figure 16:
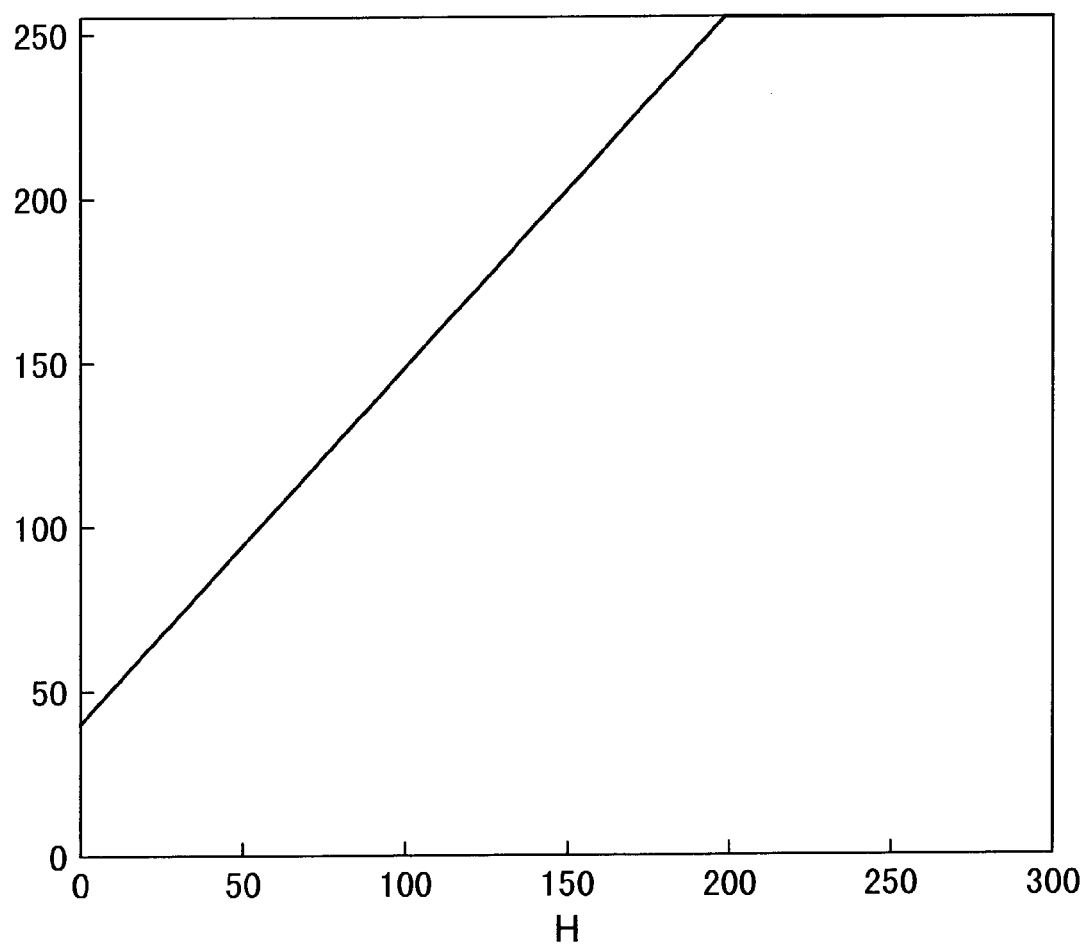
FIG. 16 is a graph showing a simple line function available instead of the sigmoid function of FIG. 3.

For example, instead of the sigmoid function of the equation (3), a simple line function as shown in FIG. 16 may be used for converting H(i, j) to I(i, j). In addition, instead of the numerator of the equation (2), a differential operator of the prior art such as a Laplacian operator may be used for the conversion of the equation (2). However, the success rate of moving object tracking can be improved by performing the normalization like the equation (2).

What is claimed is:

1. A moving object tracking method of processing first time-series pictures to track moving objects therein, the method comprising the steps of:

(a) generating second time-series pictures by converting the first time-series pictures to respective spatial differential frame pictures, a pixel of the spatial differential frame pictures having a value 'I' associated with a differential value between a value of the pixel and values of its neighboring pixels, the value 'I' being associated with a value 'H' proportional to a value obtained by dividing the differential value by a maximum value among the value of the pixel and the values of the neighboring pixels; and (b) discriminating moving objects at a time t2 based on a correlation between one of the spatial differential frame pictures at a time t1 adjacent to the time t2 and another of the spatial differential frame pictures at the time t2, and also based on a discrimination result of moving objects included in said one of the spatial differential frame pictures at the time t1.

2. The moving object tracking method according to claim 1, wherein, if the value H is within a predetermined range, then the value I is determined by an approximate linear transformation of the value H, or else, the value I is determined by converting the value H to a value which is suppressed so as not to exceed an assumable maximum value Gmax of a pixel of the spatial differential frame picture.

3. The moving object tracking method according to claim 1, wherein in the step (b), each of the spatial differential frame pictures at the times t1 and t2 is divided into blocks each including a plurality of pixels;

the moving object discrimination result at the time t1 is an object map at the time t1 which includes an identification code of a moving object assigned to at least one of the blocks, said one including a portion of the moving object, and also includes a moving vector of said at least one of the blocks; and an object map at the time t2 is produced to discriminate a moving object at the time t2.

4. The moving object tracking method according to claim 2, wherein on the basis of a sigmoid function $f(H)=1/\{1+\exp[-\beta(H-\alpha)]\}$, the value I=Gmax·f(H) is determined, where H is said proportional value, and α and β are positive constants.

5. The moving object tracking method according to claim 2, wherein the object map at the time t2 is produced by the steps of:

assuming that a block i in the object map at the time t2 has an identification code IDi and a moving vector Vi;

calculating a unit correlation between an image of the block i in the spatial differential frame picture at the time t2 and an image of a box in the spatial differential frame picture at the time t1, the box being determined by moving a box of the block i by a vector−Vi; and calculating a total sum of the unit correlations over all blocks at the time t2 so as to produce the object map at the time t2 at a maximum value among the total sums.

6. The moving object tracking method according to claim 4, wherein the constant β is a value in a range of 0.05 to 0.50.

7. The moving object tracking method according to claim 4, wherein in the step (b), each of the spatial differential frame pictures at the times t1 and t2 is divided into blocks each including a plurality of pixels;

the moving object discrimination result at the time t1 is an object map at the time t1 which includes an identification code of a moving object assigned to at least one of the blocks, said one including a portion of the moving object, and also includes a moving vector of said at least one of the blocks; and an object map at the time t2 is produced to discriminate a moving object at the time t2.

8. A moving object tracking apparatus of processing a first time-series pictures to track moving objects therein, the apparatus comprising:

a picture recording section for storing the first time-series pictures;

a picture conversion section for generating second time-series pictures by converting the first time-series pictures to respective spatial differential frame pictures, and for storing the generated second time-series pictures into the picture recording section, a pixel of the spatial differential frame pictures having a value 'I' associated with a differential value between a value of the pixel and values of its neighboring pixels, the value 'I' being associated with a value 'H' proportional to a value obtained by dividing the differential value by a maximum value among the value of the pixel and the values of the neighboring pixels; and a picture processing section for discriminating moving objects at a time t2 based on a correlation between one of the spatial differential frame pictures at a time t1 adjacent to the time t2 and another of the spatial differential frame pictures at the time t2, and also based on a discrimination result of moving objects included in said one of the spatial differential frame pictures at the time t1.

9. The moving object tracking apparatus according to claim 8, wherein the picture conversion section, determines the value I by an approximate linear transformation of the value H if the value H is within a predetermined range, or else, the picture conversion section determines the value I by converting the value H to a value which is suppressed so as not to exceed an assumable maximum value Gmax of a pixel of the spatial differential frame picture.

10. The moving object tracking apparatus according to claim 9, wherein in the picture processing section, each of the spatial differential frame pictures at the times t1 and t2 is divided into blocks each including a plurality of pixels;

the moving object discrimination result at the time t1 is an object map at the time t1 which includes an identification code of a moving object assigned to at least one of the blocks, said one including a portion of the moving object, and also includes a moving vector of said at least one of the blocks; and an object map at the time t2 is produced to discriminate a moving object at the time t2.

11. The moving object tracking apparatus according to claim 8, wherein the picture conversion section, on the basis of a sigmoid function $f(H)=1/\{1+\exp[-\beta(H-\alpha)]\}$, determines the value $I=Gmax \cdot f(H)$, where H is said proportional value, and $\alpha$ and $\beta$ are positive constants.

12. The moving object tracking apparatus according to claim 11, wherein the constant $\beta$ is a value in a range of 0.05 to 0.50.

13. The moving object tracking apparatus according to claim 12, wherein in the picture processing section, each of the spatial differential frame pictures at the times t1 and t2 is divided into blocks each including a plurality of pixels;

the moving object discrimination result at the time t1 is an object map at the time t1 which includes an identification code of a moving object assigned to at least one of the blocks, said one including a portion of the moving object, and also includes a moving vector of said at least one of the blocks; and an object map at the time t2 is produced to discriminate a moving object at the time t2.

14. The moving object tracking apparatus according to claim 11, wherein in the picture processing section, each of the spatial differential frame pictures at the times t1 and t2 is divided into blocks each including a plurality of pixels;

the moving object discrimination result at the time t1 is an object map at the time t1 which includes an identification code of a moving object assigned to at least one of the blocks, said one including a portion of the moving object, and also includes a moving vector of said at least one of the blocks; and an object map at the time t2 is produced to discriminate a moving object at the time t2.

15. he moving object tracking apparatus according to claim 8, wherein in the picture processing section, each of the spatial differential frame pictures at the times t1 and t2 is divided into blocks each including a plurality of pixels;

the moving object discrimination result at the time t1 is an object map at the time t1 which includes an identification code of a moving object assigned to at least one of the blocks, said one including a portion of the moving object, and also includes a moving vector of said at least one of the blocks; and an object map at the time t2 is produced to discriminate a moving object at the time t2.

16. The moving object tracking method according to claim 15, wherein the picture processing section:

assumes that a block i in the object map at the time t2 has an identification code IDi and a moving vector Vi;

calculates a unit correlation between an image of the block i in the spatial differential frame picture at the time t2 and an image of a box in the spatial differential frame picture at the time t1, the box being determined by moving a box of the block i by a vector −Vi; and calculates a total sum of the unit correlations over all blocks at the time t2 so as to produce the object map at the time t2 at a maximum value among the total sums.

17. The moving object tracking apparatus according to claim 8, wherein in the picture processing section, each of the spatial differential frame pictures at the times t1 and t2 is divided into blocks each including a plurality of pixels;

the moving object discrimination result at the time t1 is an object map at the time t1 which includes an identification code of a moving object assigned to at least one of the blocks, said one including a portion of the moving object, and also includes a moving vector of said at least one of the blocks; and an object map at the time t2 is produced to discriminate a moving object at the time t2.

* * * * *

UNITED STATES PATENT AND TRADEMARK OFFICE
CERTIFICATE OF CORRECTION

PATENT NO. : 7,149,328 B2  
APPLICATION NO. : 10/379560  
DATED : December 12, 2006  
INVENTOR(S) : Shunsuke Kamijo et al.

It is certified that error appears in the above-identified patent and that said Letters Patent is hereby corrected as shown below:

Column 12, Line 27, change "he" to --The--.

Signed and Sealed this

Fourth Day of March, 2008

JON W. DUDAS  
*Director of the United States Patent and Trademark Office*